US008045521B2

(12) United States Patent
Godavarti et al.

(10) Patent No.: US 8,045,521 B2
(45) Date of Patent: Oct. 25, 2011

(54) SYSTEM AND METHOD FOR INTER-WORKING IN A MULTI PROTOCOL REVISION BASED EVOLUTION DATA ONLY/EVOLUTION DATA OPTIMIZED (EVDO) COMMUNICATION SYSTEMS

(75) Inventors: Satya Venkata Uma Kishore Godavarti, Kamataka (IN); Tirumala Sree Hari Vara Prasad Vadlapudi, Kamataka (IN); Agiwal Anil, Kamataka (IN)

(73) Assignee: Samsung Electronics Co., Ltd (KR)

( * ) Notice: Subject to any disclaimer, the term of this patent is extended or adjusted under 35 U.S.C. 154(b) by 1039 days.

(21) Appl. No.: 11/831,618

(22) Filed: Jul. 31, 2007

(65) Prior Publication Data

US 2008/0049759 A1 Feb. 28, 2008

(30) Foreign Application Priority Data

Jul. 31, 2006 (IN) ............................ 1345/CHE/2006

(51) Int. Cl.
*H04W 4/00* (2009.01)
*H04L 12/28* (2006.01)
*H04L 12/56* (2006.01)

(52) U.S. Cl. ..................................... 370/331; 370/395.2

(58) Field of Classification Search .................. 370/331, 370/395.2, 395.32, 395.5
See application file for complete search history.

(56) References Cited

U.S. PATENT DOCUMENTS

| 6,496,704 | B2 | 12/2002 | Yuan | |
|---|---|---|---|---|
| 6,731,632 | B1 | 5/2004 | Takahashi et al. | |
| 7,532,887 | B2 * | 5/2009 | Kyung et al. | 455/439 |
| 2003/0133494 | A1 * | 7/2003 | Bender et al. | 375/130 |
| 2006/0094437 | A1 * | 5/2006 | Sinnarajah et al. | 455/452.1 |
| 2006/0133409 | A1 * | 6/2006 | Prakash et al. | 370/450 |
| 2006/0174004 | A1 * | 8/2006 | Asthana | 709/225 |
| 2006/0217124 | A1 * | 9/2006 | Bi et al. | 455/450 |
| 2006/0259628 | A1 * | 11/2006 | Vadlapudi et al. | 709/227 |
| 2007/0110071 | A1 * | 5/2007 | Rezaiifar et al. | 370/395.2 |
| 2007/0133476 | A1 * | 6/2007 | Li et al. | 370/335 |

* cited by examiner

*Primary Examiner* — Xavier Szewai Wong
(74) *Attorney, Agent, or Firm* — The Farrell Law Firm, P.C.

(57) ABSTRACT

Interworking in a multi-protocol revision based Evolution Data Only/Evolution Data Optimized (EVDO) communication system is described. In this scheme, an access terminal (AT) and an access network (AN) perform session configuration in multi-protocol scenarios. The AT maintains a set indicating all the protocol revisions it supports. The AT and AN start their session negotiation with the subtypes corresponding to the highest protocol revision supported by AT and AN. There are two scenarios in which AT sends the Unicast Access Terminal Identifier (UATI) request message with protocol revisions: power up and idle handoff.

9 Claims, 4 Drawing Sheets

SYSTEM AND METHOD FOR INTER-WORKING IN A MULTI PROTOCOL REVISION BASED EVOLUTION DATA ONLY/EVOLUTION DATA OPTIMIZED (EVDO) COMMUNICATION SYSTEMS

PRIORITY

This application claims priority under 35 U.S.C. §119 to an application filed in the Indian Intellectual Property Office on Jul. 31, 2006, assigned Ser. No. 1345/CHE/2006, the contents of which are incorporated herein by reference.

BACKGROUND OF THE INVENTION

1. Field of the Invention

The present invention, in general, relates to the field of mobile communication technology. The invention relates to Evolution Data Only/Evolution Data Optimized (EVDO) and its evolved communication systems having multiple protocol revisions. It describes a system and method for efficiently operating in a system in which the access terminal is moving across access networks supporting different protocol revisions. More particularly, the invention relates to a system and method for inter-working in a multi protocol revision based EVDO communication systems.

2. Description of the Related Art

The following terms are used throughout this application as follows:

Access Network: The network equipment which provides data connectivity between a packet switched data network (typically the Internet) and access terminals.

Access Terminal: A device providing data connectivity to a user. An access terminal may be connected to a computing device such as a laptop personal computer or it may be a self-contained data device such as a Personal Digital Assistant (PDA). An access terminal is equivalent to a mobile station.

EV-DO: CDMA2000 1× evolution-Data Optimized system.

MAC: Medium Access Control Protocol

The EVDO communication system consists of several protocols and applications, which define the procedures to be followed by the Access Network (AN) and the Access Terminal (AT) to communicate with each other. Each protocol/application has several subtypes. A subtype of a protocol/application defines a distinct procedure to be used for the operation of that protocol/application. Each subtype of a protocol/application contains several configurable attributes, which govern its operation. The EVDO communication system provides procedure to negotiate and configure the protocol/application subtypes and their corresponding attributes between the AT and AN. Configuration Request and Configuration Response messages are exchanged between AT and AN to negotiate protocol/application subtypes and their corresponding attributes.

The set of negotiated and configured protocol/application subtypes and the corresponding attributes constitutes an EVDO session. In other words, an EVDO session refers to a shared state between the AT and the AN. This shared state stores the protocols/applications and the protocol/application configurations that were negotiated and are used for communications between the AT and the AN. Session Configuration Protocol (SCP) defines the procedure to negotiate and configure multiple EVDO sessions. These multiple EVDO sessions negotiated and configured by SCP are also referred to as multiple personalities. Each personality configured is identified by a personality index. At a given point of time only one personality will be in use between the AT and AN. The personality index in use is stored in a Session Configuration Token (SCT).

Each protocol/application can have two instances, InConfiguration and InUse instances. An InUse instance is the working instance of a protocol/application. At power-up, an EVDO session constitutes default set of Protocol and Application subtypes and also default values for attributes of these Protocols and Application subtypes. An InConfiguration instance of each protocol/application is created by the SCP when the session negotiation is initiated. Once the session negotiation is complete, the configured values of the InConfiguration instances are stored by the AT and AN at a given personality index. After configuring the multiple sessions, the AN informs the AT about the session to be used using a configuration complete or soft configuration complete message (personality index corresponding to the session to be used is encoded in session configuration token which is sent in configuration complete or soft configuration complete message).

Session configuration can be initiated by the AT or AN.

A protocol revision defines a default set of protocol/application subtypes, which are used by the AT until the session configuration. In the current EVDO system, only one default set of protocol/application subtype exists. At Power Up, the AT creates InUse Instances corresponding to this default set of protocol subtypes. AT's InUse instances are changed from the default to non-default subtypes only by session negotiation.

In the current EVDO communication system only one default set of protocol/application subtypes exists. At power up the access terminal creates InUse instances corresponding to the default set of protocol/application subtypes. AT's InUse instances can be changed from default to non-default subtypes only by session negotiation.

In a multi-protocol revisions system, there is a need to have multiple default sets of protocols. So that the new deployments can directly operate on a system specific to a protocol revision without having to support all previous revisions of the system. Even AT's can be implemented only for some protocol revisions.

In the current system there are no defined procedures for interworking in a system in which the AT is moving across the ANs supporting different protocol revisions of the system.

Therefore, there is a need in the art for techniques or mechanisms which will allow the AT and AN to operate efficiently in a multi protocol revision system.

SUMMARY OF THE INVENTION

The approach taught by this invention:

1. Facilitates creation of protocol subtypes corresponding to maximum protocol revision that is supported by both an AT and AN without having to start negotiation with only one set of defined protocol subtypes;

2. Defines a mechanism for the AN and AT to communicate the protocol revisions supported by each other;

3. Facilitates usage of established session negotiation by both the AT and AN during idle handoffs; and 4. Avoids/Reduces session negotiation, if required, after idle handoffs.

The current approach of configuring session in EVDO communication systems is modified such that in the systems with multiple protocol revisions, the AT and AN can start their session negotiation with the subtypes corresponding to the highest protocol revision supported by the AT and AN. In the special case of using default values for all the subtypes, session negotiation itself can be avoided. The invention also provides a method to communicate between the AT and AN about the protocol revisions supported by each.

Accordingly this invention provides a method for interworking in a multi protocol revision based EVDO communication systems including performing a session configuration by an Access Terminal (AT) and an Access Network (AN); maintaining a set by AT indicating all the protocol revisions said AT supports; and AT and AN performing session negotiation with the subtypes corresponding to a maximum protocol revision supported by the AT and AN, wherein the AT sends a Unicast Access Terminal Identifier (UATI) request message with protocol revisions using power up and idle handoff procedures.

Accordingly, this invention provides a system for interworking in a multi protocol revision based EVDO communication systems including an Access Terminal (AT) and Access Network (AN) performing a session configuration; and means for maintaining a set by the AT indicating all the protocol revisions said AT supports and said AT and AN performing session negotiation by the AT and AN with the subtypes corresponding to a maximum protocol revision supported by the AT and AN, wherein the AT sends a Unicast Access Terminal Identifier (UATI) request message with protocol revisions using power up and idle handoff procedures.

BRIEF DESCRIPTION OF THE ACCOMPANYING DRAWINGS

The above and other objects, features, and advantages of the present invention will become more apparent from the ensuing detailed description of the invention, taken in conjunction with the accompanying drawings in which.

DETAILED DESCRIPTION OF THE PREFERRED EMBODIMENT

Figure 1:
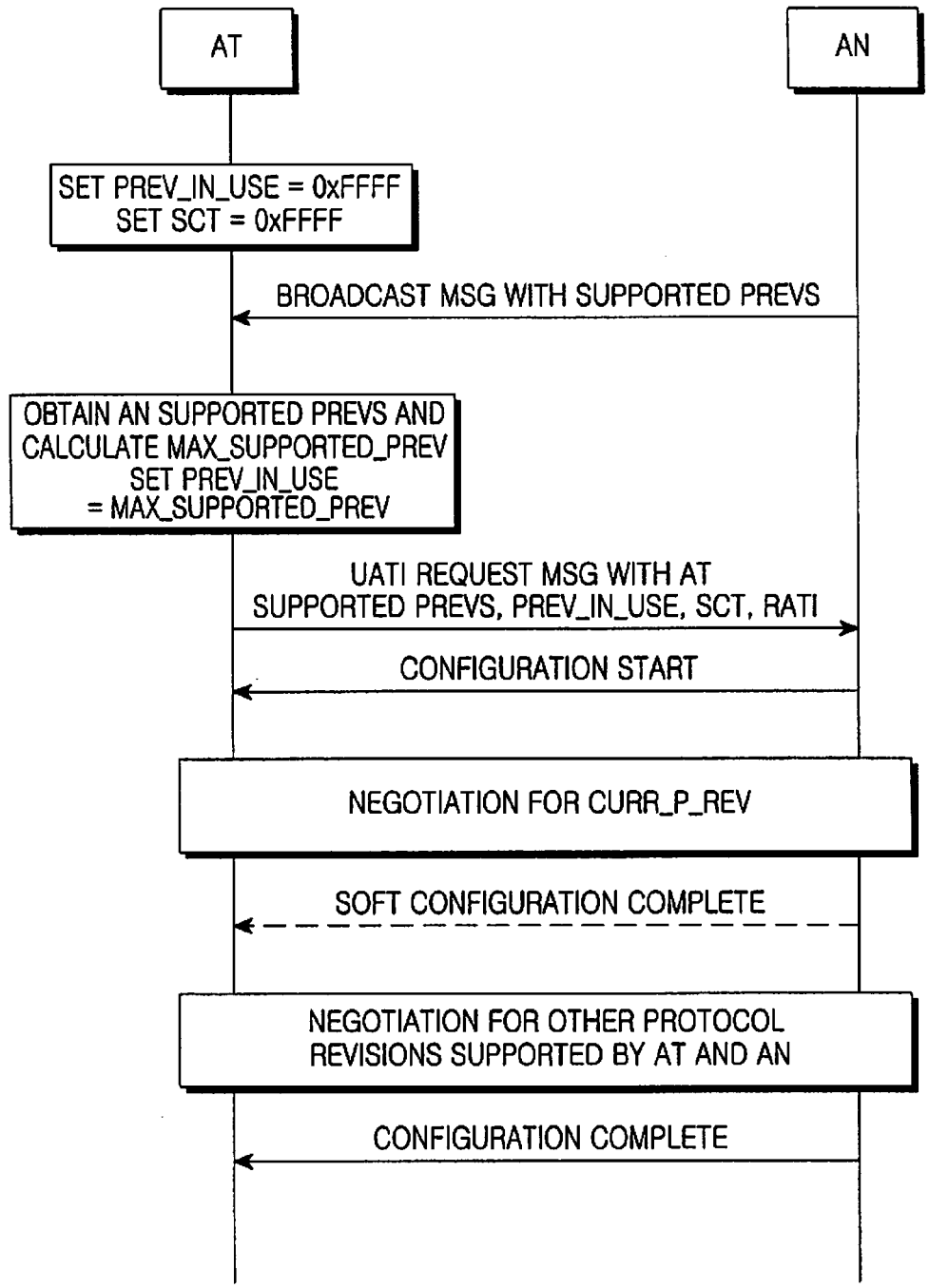
FIG. 1 depicts a signal flow diagram in a multi protocol revision based systems.

The preferred embodiments of the present invention will now be explained with reference to the accompanying drawings. However, it should be understood that the disclosed embodiments are merely exemplary of the invention, which may be embodied in various forms. Therefore the details disclosed herein are not to be interpreted as limiting but merely as the basis for the claims and as a basis for teaching one skilled in the art how to make or use the invention.

In a system with multiple protocol revisions, the system defines different default sets of protocol/application subtypes corresponding to the each protocol revision that the system supports. This information can be used by an AT and AN to perform an efficient session negotiation.

The AN transmits the information about the protocol revisions supported by it in a broadcast message. After acquiring the system the AT gets the information about the protocol revisions supported by the AN from the broadcast message transmitted by the AN.

When access terminal supports one or more protocol revisions of the system, it maintains a set indicating all the protocol revisions it supports. The AT calculates the maximum protocol revision supported by the AT and AN according to the following Equation (1).

$$\text{max\_supported\_prev} = \text{Maximum}(\{\text{Set of protocol revisions supported by both the } AT \text{ and } AN\}) \quad (1)$$

Where, {Set of protocol revisions supported by both the $AT$ and $AN$}={Protocol revisions supported by the $AT$}∩{Protocol revisions supported by the AN}

The AT also maintains a variable 'prev_in_use' which indicates the protocol revision which is being used by the AT to communicate with the AN. During power up procedures, the AT sets 'prev_in_use' to 'max_supported_prev' and creates the InUse instances of the applications and protocol subtypes meant for the system corresponding to the prev_in_use. Then the AT sends an UATI request message by including all the protocol revisions that it supports and the selected prev_in_use. Along with UATI request message the AT also sends Session Configuration Token (SCT) being used by the AT. The SCT indicates whether the AT is using a default or configured session. If the AN has the knowledge about neighbour networks with different protocol revisions, the AN can configure a separate personality for each protocol revision that both the AT and the AN support as part of the session negotiation. This negotiation can be used by the AT and AN during Handoff to neighbour networks.

When the AT receives a new SCT after session negotiation/personality switch, it has to update the prev_in_use to a protocol revision corresponding to the personality index received in the SCT.

There are two scenarios in which the AT sends the UATI request message with protocol revisions, during:

1. Power up
2. Idle handoff to a system with different protocol revision

Power Up Procedures—

AT Procedures: When the AT powers up it performs the following operations

1. It sets the 'prev_in_use' to NONE (a predefined value ex., 0xFFFF);
2. It sets the Session Configuration Token to NONE (a predefined value ex., 0xFFFF);
3. Obtains the AN supported protocol revisions by monitoring broadcast messages;
4. The AT calculates the max_supported_prev and sets prev_in_use=max_supported_prev;
5. The AT creates InUse instances of the protocols corresponding to the default set for 'prev_in_use';
6. The AT sends a UATI request message by including the AT supported protocol revisions and 'prev_in_use'. As part of the UATI request message transmission, SCT and Random AT Identifier (RATI) also get transmitted in the MAC header.

AN Procedures:

1. When an AN receives a UATI request message, it checks the SCT and RATI:
    a. The RATI indicates that the AT is not having any configured session;
    b. SCT==NONE, indicates that the AT is using default protocol set corresponding to prev_in_use;
2. The AN will initiate the session configuration:
    a. The AN can configure multiple personalities, corresponding to each protocol revision supported by the AT;
    b. The AN sets the SCT to the personality to be used.

Idle Handoff Procedures—When the AT roams in a network, it performs idle handoffs across the cell boundaries and network boundaries. After idle handoff to a system/network with different protocol revision, the AT obtains the protocol revisions supported by the AN by monitoring broadcast messages and calculates the max_supported_prev by using above.

There are different scenarios for these procedures. Detailed procedure for each scenario is explained below.

Figure 2:
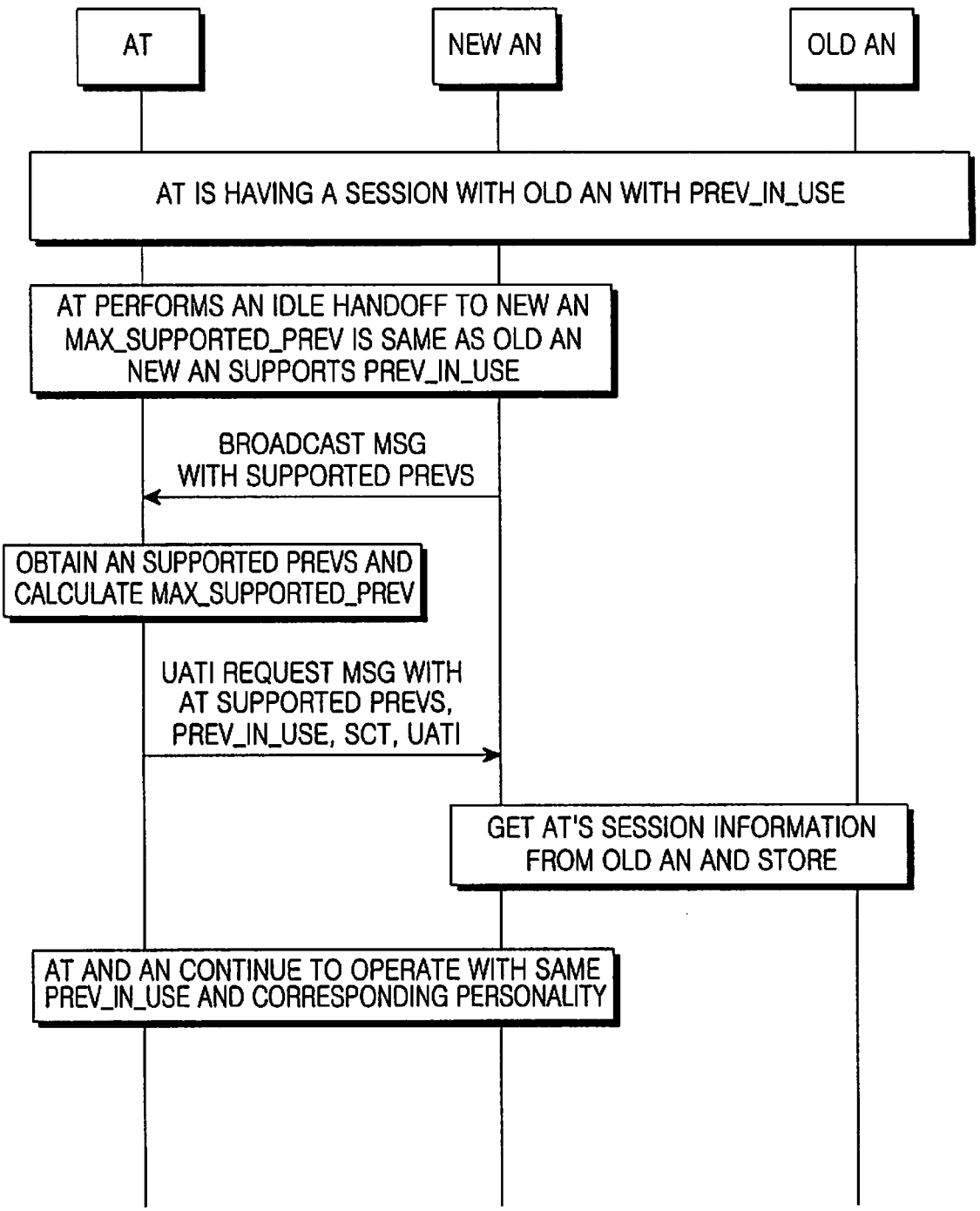
FIG. 2 depicts the signal flow for Idle Handoff procedures for scenario 1 in a multi protocol revision based systems.

Idle Handoff Scenario 1: (The detailed call flow is shown in FIG. 2)

The AT has an established session with the old AN and has moved to a new AN. prev_in_use is supported by the new AN and prev_in_use is equal to max_supported_prev between the AT and the new AN.

AT Procedures:

1. Send a UATI request message with the AT supported protocol revisions and prev_in_use. As part of the UATI request message transmission, the SCT and UATI also get transmitted in the MAC header.

AN Procedures:

1. The AN receives a UATI request message and checks the SCT;
2. The UATI received in the MAC header indicates that the AT is having a session;
3. SCT!=NONE, indicates that the AT is using a personality corresponding to the personality index indicated by the SCT;
4. The AN will get the AT's session information from an old AN;
5. The AN will store the session information received from an old AN;
6. As the AT is already using the personality corresponding to 'Max_Supported_Prev', there is no need to switch personality;
7. However, the AN may do a session configuration;
  i. To change some parameters of InUse personality and/or
  ii. To create a new personality corresponding to a protocol revision (supported by both the AT and AN) which does not exist;
8. The AN will send a session close and configure a new session if the new AN is not able to retrieve the AT's session information from the old AN.

Idle Handoff Scenario 2:

The AT has an established session with an old AN and has moved to a new AN; prev_in_use is supported by the new AN and prev_in_use is not equal to max_supported_prev between the AT and new AN.

AT Procedures:

1. Send a UATI request message with the AT supported protocol revisions and prev_in_use. As part of the UATI request message transmission, the SCT and UATI also get transmitted in the MAC header.

AN Procedures:

1. The AN receives a UATI request message and checks the SCT;
2. The UATI received in the MAC header indicates that the AT is having a session;
3. SCT!=NONE indicates that the AT is using a personality corresponding to the personality index indicated by the SCT;
4. The AN will get the AT's session information from the old AN;
5. The AN will store the session information received from the old AN;
6. At this stage, the AN and AT continue to work with personality corresponding to prev_in_use;
7. prev_in_use as received in the UATI message indicates that the AT is not using the personality corresponding to 'max_supported_prev';
8. If the AT already has a personality corresponding to 'max_supported_prev':
  i. The AN will switch the AT's InUse personality to the personality corresponding to 'max_supported_prev';
9. If the AT doesn't have a personality corresponding to 'max_supported_prev':
  i. AN will create a personality corresponding to max_supported_prev and will switch the AT to new personality corresponding to max_supported_prev;
10. The AN may also do a session configuration:
  i. To change some parameters of InUse personality and/or
  ii. To create a new personality corresponding to a protocol revision, (supported by both AT and AN) which is not existing.
11. The AN will send a session close and configure a new session if a new AN is not able to retrieve the AT's session information from an old AN.

Figure 3:
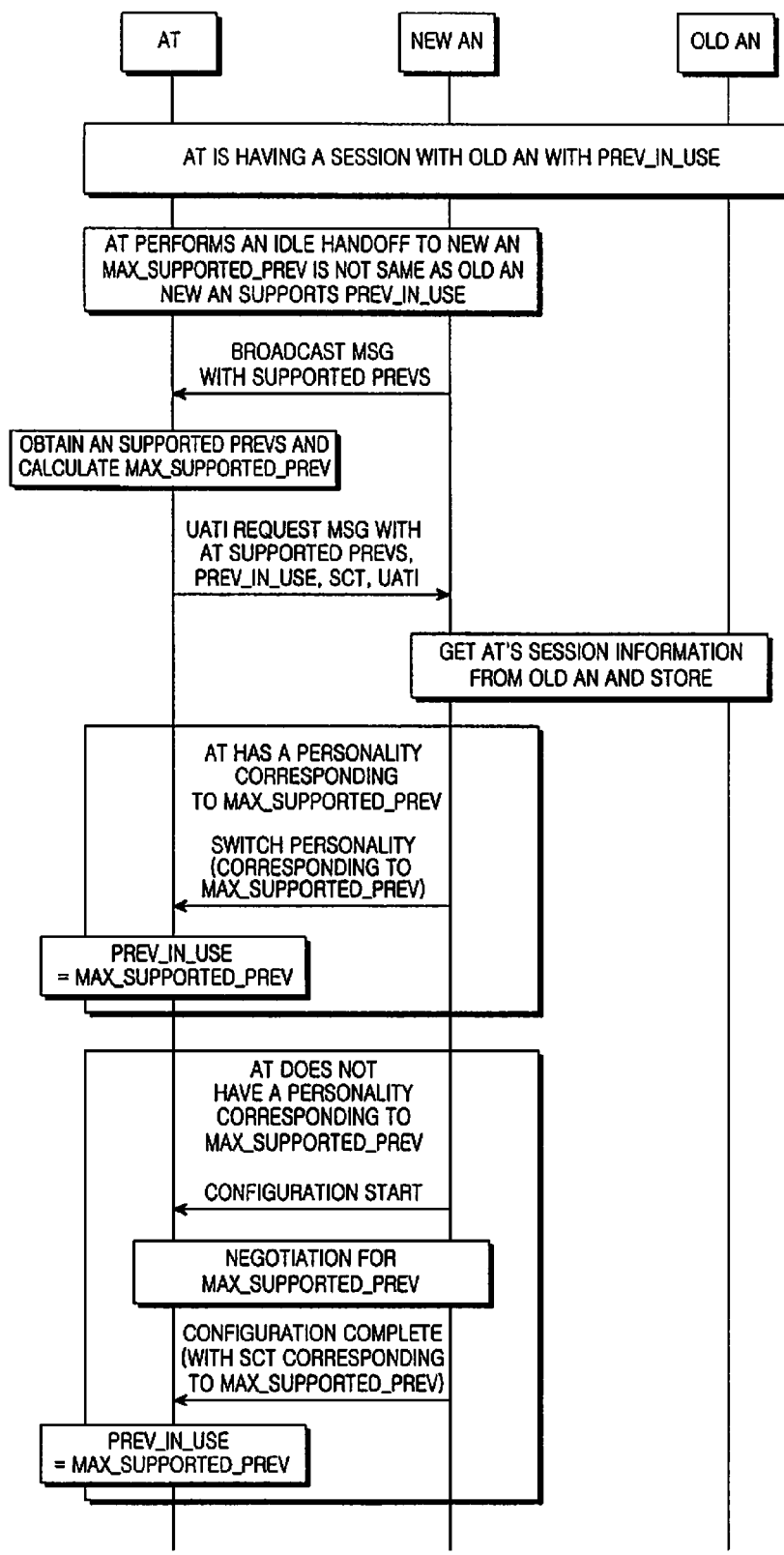
FIG. 3 depicts the signal flow for Idle Handoff procedures for scenario 2 in a multi protocol revision based systems.

Idle Handoff Scenario 2 (Alternate Procedure—1) (The detailed call flow for Scenario 2 is shown in FIG. 3):

AT Procedures:

1. Set prev_in_use=max_supported_prev;
2. Set SCT=NONE (i.e., 0xFFFF);
3. Create the InUse Instances of the protocols corresponding to the default set of 'prev_in_use';
4. Send a UATI request message with the AT supported protocol revisions and 'prev_in_use'. As part of the UATI request message transmission, the SCT and UATI also get transmitted in the MAC header.

AN Procedures:

1. The AN receives a UATI request message and checks the SCT;
2. The UATI received in the MAC header indicates that the AT is having a session;
3. SCT==NONE, 'prev_in_use' indicates that AT is using default set corresponding to 'prev_in_use';
4. The AN will get the AT's session information from an old AN;
5. The AN will store the session information received from the old AN;
6. If the AT already has a personality corresponding to 'max_supported_prev':
  i. AN will switch the AT's InUse personality to the personality corresponding to 'max_supported_prev';
7. If the AT doesn't have a personality corresponding to 'max_supported_prev':
  i. The AN will create a personality corresponding to 'max_supported_prev' and will switch the AT to new personality corresponding to 'max_supported_prev';
8. The AN may also do a session configuration:
  a. To change some parameters of InUse personality and/or
  b. To create a new personality corresponding to a protocol revision (supported by both the AT and AN) which is not existing;
9. The AN will send a session close and configure a new session if a new AN is not able to retrieve the AT's session information from an old AN.

Idle Handoff Scenario 2 (Alternate Procedure—2) (The detailed call flow for Scenario 2 is shown in FIG. 3):

This procedure can be done only if the AT is having a personality configured by the old AN corresponding to 'max_supported_prev'.

AT Procedures:

1. Set prev_in_use=max_supported_prev;
2. Set the SCT corresponding to the personality configured by an old AN for this 'prev_in_use';
3. Create the InUse Instances of the protocols corresponding to the new 'prev_in_use';
4. Send a UATI request message with the AT supported protocol revisions and prev_in_use. As part of the UATI request message transmission, the SCT and UATI also get transmitted in the MAC header.

AN Procedures:

1. The AN receives a UATI request message and checks the SCT;

2. The UATI received in the MAC header indicates that the AT is having a session;

3. SCT!=NONE indicates that the AT is using a personality corresponding to the personality index indicated by the SCT;

4. The AN will get the AT's session information from the old AN;

5. The AN will store the session information received from the old AN;

6. As the AT is already using the personality corresponding to 'max_supported_prev', there is no need to switch personality;

7. However, the AN may do a session configuration:

i. To change some parameters of InUse personality and/or ii. To create a new personality corresponding to a protocol revision (supported by both the AT and AN) which does not exist.

8. The AN will send a session close and configure a new session if a new AN is not able to retrieve the AT's session information from an old AN.

Figure 4:
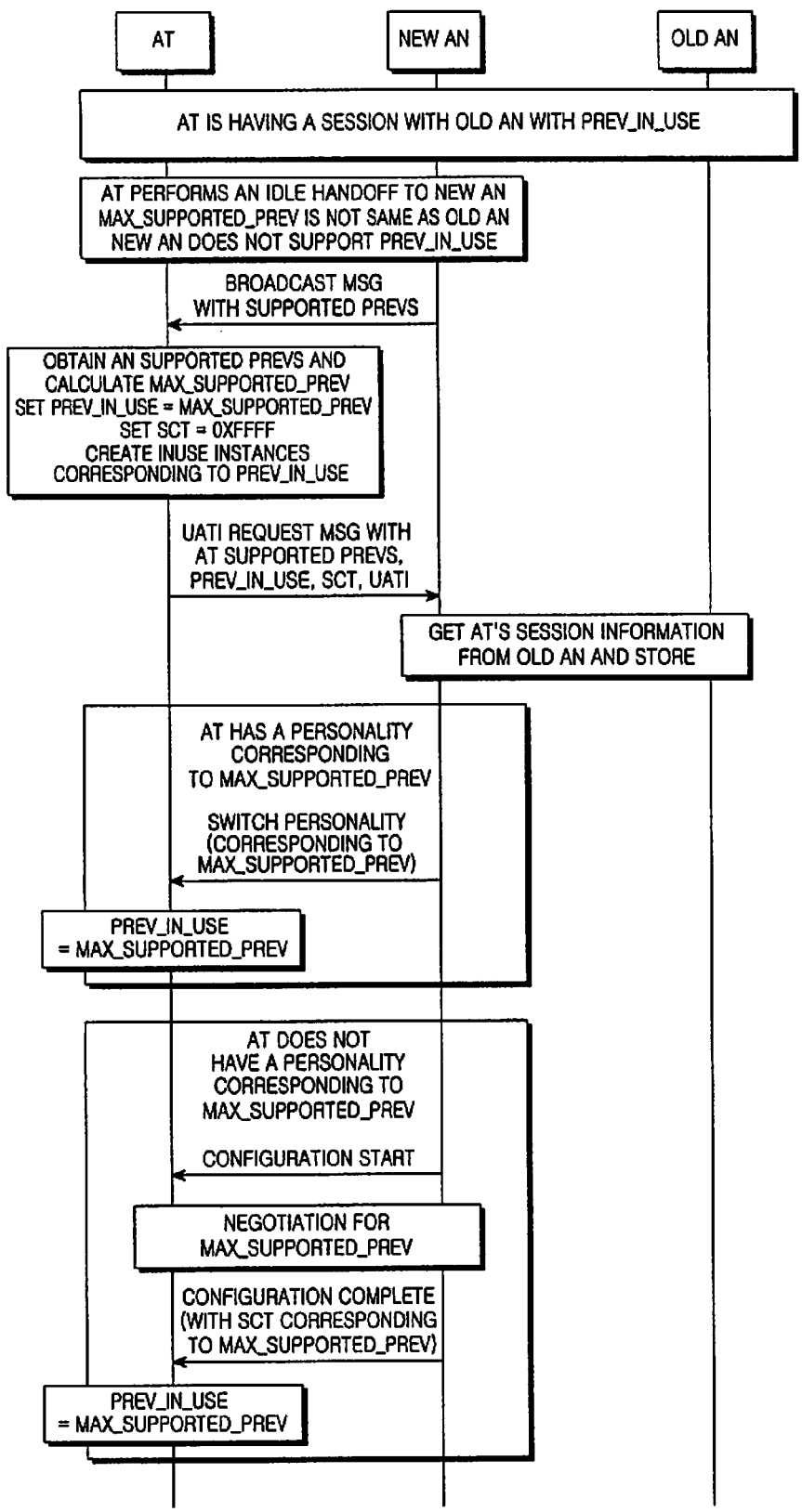
FIG. 4 depicts the signal flow for Idle Handoff procedures for scenario 3 in a multi protocol revision based systems.

Idle Handoff Scenario 3 (The detailed call flow is shown in FIG. 4):

The AT has an established session with an old AN and has moved to a new AN; prev_in_use is not supported by the new AN.

AT Procedures:

1. Set prev_in_use=max_supported_prev;

2. Set SCT=NONE (i.e., 0xFFFF);

3. Create the InUse Instances of the protocols corresponding to the default set of 'prev_in_use';

4. Send a UATI request message with the AT supported protocol revisions and 'prev_in_use'. As part of the UATI request message transmission, the SCT and UATI also get transmitted in the MAC header.

AN Procedures:

1. The AN receives a UATI request message and checks the SCT;

2. The UATI received in the MAC header indicates that the AT is having a session;

3. SCT==NONE, prev_in_use indicates that the AT is using default set corresponding to prev_in_use;

4. The AN will get the AT's session information from an old AN;

5. The AN will store the session information received from an old AN;

6. If the AT already has a personality corresponding to 'max_supported_prev':

a. The AN will switch the AT's InUse personality to the personality corresponding to 'max_supported_prev';

7. If the AT doesn't have a personality corresponding to 'max_supported_prev':

b. The AN will create a personality corresponding to 'max_supported_prev' and will switch AT to new personality corresponding to 'max_supported_prev';

8. The AN may also do a session configuration:

a. To change some parameters of InUse personality and/or b. To create a new personality corresponding to a protocol revision (supported by both the AT and AN) which is not existing;

9. The AN will send a session close and configure a new session if a new AN is not able to retrieve the AT's session information from an old AN;

Idle Handoff Scenario 3 (Alternate Procedure—1) (The detailed call flow for Scenario 3 is shown in FIG. 4):

This procedure can be done only if the AT is having a personality configured by the old AN corresponding to 'max_supported_prev':

AT Procedures:

1. Set prev_in_use=max_supported_prev;

2. Set the SCT corresponding to the personality configured by an old AN for this 'prev_in_use';

3. Create the InUse Instances of the protocols corresponding to the new 'prev_in_use';

4. Send a UATI request message with the AT supported protocol revisions and 'prev_in_use'. As part of the UATI request message transmission, the SCT and UATI also get transmitted in the MAC header.

AN Procedures:

1. The AN receives a UATI request message and checks the SCT;

2. The UATI received in the MAC header indicates that the AT is having a session;

3. SCT!=NONE indicates that the AT is using a personality corresponding to the personality index indicated by the SCT;

4. The AN will get the AT's session information from an old AN;

5. The AN will store the session information received from the old AN;

6. As the AT is already using the personality corresponding to 'max_supported_prev', there is no need to switch personality;

7. However, the AN may do a session configuration:

a. To change some parameters of InUse personality and/or b. To create a new personality corresponding to a protocol revision (supported by both the AT and AN) which is not existing;

8. The AN will send a session close and configure a new session if the new AN is not able to retrieve the AT's session information from the old AN.

Although, the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as further defined by the appended claims.

We claim:

1. A method for inter-working in a multi protocol revision based Evolution Data Only/Evolution Data Optimized (EVDO) communication system, comprising the steps of:

performing a session configuration by an Access Terminal (AT) and an Access Network (AN);

maintaining, by the AT, a set of protocol revisions the AT supports; and performing a session negotiation by the AT and the AN with subtypes corresponding to a maximum protocol revision among a set of protocol revisions supported by both the AT and the AN, wherein the AT sends a Unicast Access Terminal Identifier (UATI) request message with protocol revisions using power up and idle handoff procedures.

2. The method as claimed in claim 1, wherein the AT calculates the maximum protocol revision supported by the AT and AN (max_supported_prev) according to:

$$\text{max\_supported\_prev} = \text{Maximum}(\{\text{the Set of protocol revisions supported by both the } AT \text{ and the } AN\})$$

Where, {the Set of protocol revisions supported by both the *AT* and the *AN*}={Protocol revisions supported by the *AT*}∩{Protocol revisions supported by the *AN*}.

3. The method as claimed in claim 1, wherein while sending the UATI request message, the AT sends a Session Configuration Token (SCT) and a Random AT Identifier (RATI) where SCT indicates whether AT is using a default or configured session.

4. The method as claimed in claim 1, wherein in a power up procedure, the AT calculates the maximum protocol revision supported by the AT and the AN and then sends the UATI request message along with the SCT and the RATI.

5. The method as claimed in claim 4, wherein the AN checks for the SCT and the RATI arrival, where the RATI indicates that the AT is not having any configured session and the SCT shows whether the AT is using a default protocol or otherwise.

6. The method as claimed in claim 5, wherein the AN configures multiple personalities corresponding to each protocol revision supported by the AT and sets the SCT to the personality in use.

7. The method as claimed in claim 1, wherein in the idle handoff procedure, the AT moves from one network to another without a call getting disconnected.

8. The method as claimed in claim 7, wherein after idle handoff to a system or network with different protocol revision, the AT gets the protocol revisions supported by the AN by monitoring the broadcast messages and calculates the maximum protocol revision supported by the AT and the AN.

9. A system for inter-working in a multi protocol revision based Evolution Data Only/Evolution Data Optimized (EVDO) communication systems, comprising:
   an access terminal (AT) and an access network (AN) performing a session configuration; and
   means for maintaining, by the AT, a set of protocol revisions the AT supports,
   wherein the AT and the AN perform session negotiation with subtypes corresponding to a maximum protocol revision among a set of protocol revisions supported by both the AT and the AN, and
   wherein the AT sends a Unicast Access Terminal Identifier (UATI) request message with protocol revisions using power up and idle handoff procedures.

* * * * *